United States Patent [19]

Jones

[11] 3,767,921
[45] Oct. 23, 1973

[54] WELL LOGGING SYSTEM WITH LINEARITY CONTROL

[75] Inventor: John M. Jones, Houston, Tex.
[73] Assignee: Texaco Inc., New York, N.Y.
[22] Filed: Mar. 31, 1972
[21] Appl. No.: 239,888

[52] U.S. Cl .......................... 250/261, 250/83.6 W
[51] Int. Cl.............................................. G01v 5/00
[58] Field of Search ................... 250/83.3 R, 83.6 W

[56] References Cited
UNITED STATES PATENTS

| | | | |
|---|---|---|---|
| 3,508,438 | 4/1970 | Alger et al. ................ | 250/83.6 W X |
| 3,638,484 | 2/1972 | Tixier......................... | 250/83.6 W X |
| 3,689,876 | 9/1972 | Kampfer .................... | 250/83.6 W X |

Primary Examiner—Archie R. Borchelt
Attorney—Thomas H. Whaley et al.

[57] ABSTRACT

An illustrative embodiment of the present invention includes method and apparatus for gamma ray spectroscopy well logging systems including a closed loop linearity control feature. A borehole tool provides gamma ray pulse data. The gamma ray counts in at least two portions of the gamma ray energy spectrum chosen so that their ratio remains relatively constant under usual borehole conditions are monitored. An error signal is developed if the ratio of gamma ray counts in the monitored portions of the energy spectrum deviate significantly from the constant ratio. The error signal is used to control the power supply voltage for the borehole tool and/or the surface amplification of the gamma ray pulse signals to preserve system linearity.

9 Claims, 2 Drawing Figures

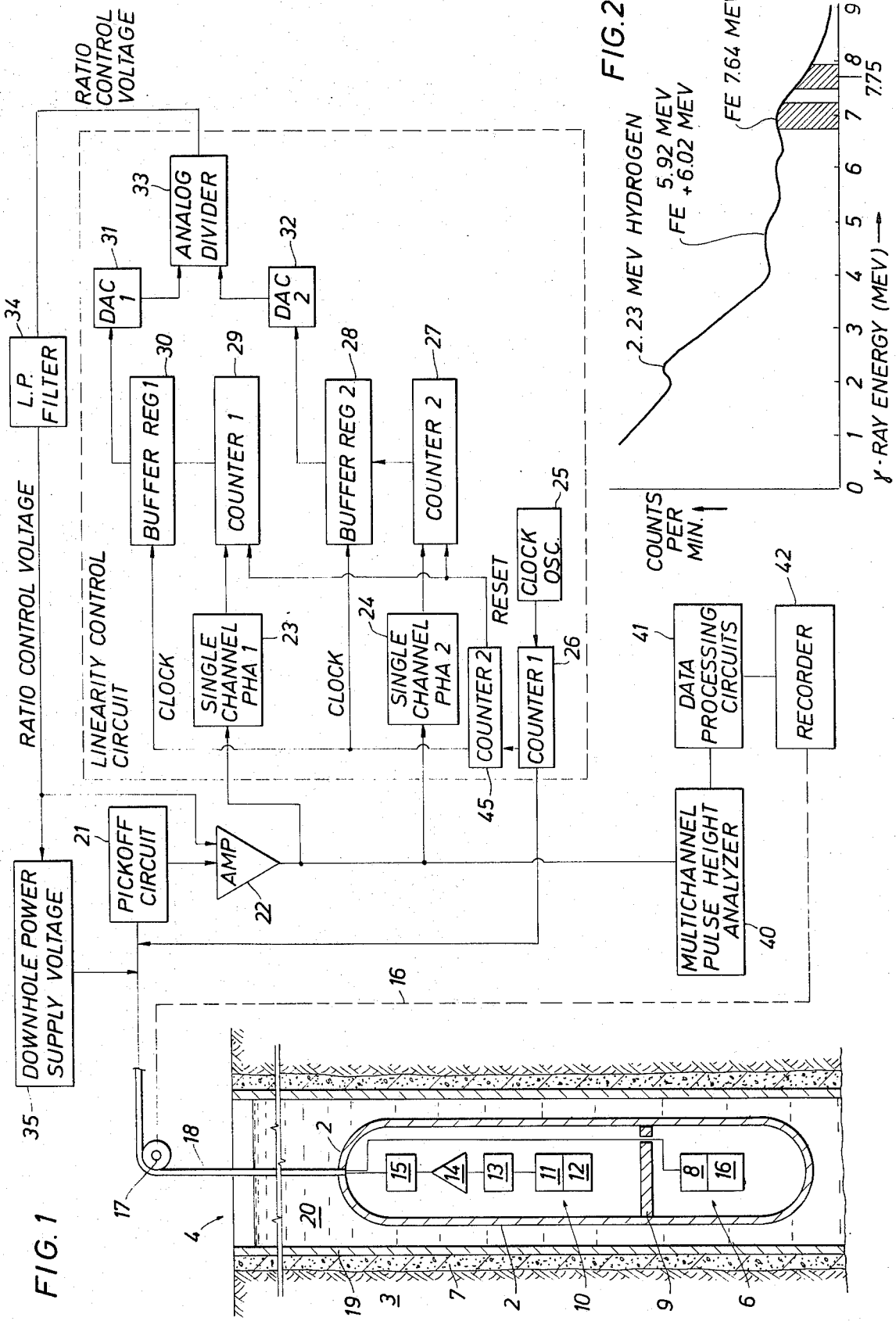

WELL LOGGING SYSTEM WITH LINEARITY CONTROL

BACKGROUND OF THE INVENTION

This invention relates to radiological well logging methods and apparatus for investigating subsurface earth formations traversed by a borehole and, more particularly, to gain control means for use in gamma ray energy spectra well logging systems.

It is well known that oil and gas are more likely to be found in commercially recoverable quantities in those earth formations which are relatively porous and permeable than in more highly consolidated formations. It is also well known that an oil or gas filled earth formation or strata may be located by irradiating the earth formations surrounding a borehole with neutrons and measuring the intensity of the resultant gamma radiations which are produced at various levels in the borehole. Various proposals for measuring either the thermal capture gamma ray energy spectra of such earth formations irradiated with neutrons or the inelastic scattering gamma ray energy spectra of the earth formations so irradiated have been proposed in the prior art.

Typical well logging systems proposed in the prior art for measuring these types of gamma ray energy spectra have included downhole neutron generating means and downhole gamma ray detecting means suspended via a well logging cable in the borehole. Surface processing equipment is also usually provided for interpreting electrical pulses produced in response to the gamma rays by the detection means. Usually proportional detectors of the scintillation type have been proposed for measuring the quantity and energy of gamma rays occurring from the resultant neutron irradiation. Electrical pulses whose amplitude is representative of the energy of gamma rays passing through a detector scintillator crystal are sent to the surface via the well logging cable. The surface equipment then processes these pulses in some manner usually in order to determine the numerical distribution of pulses as a function of their pulse height which is usually related to the energy of the gamma ray causing the pulse.

It is apparent that in a system of this sort in which both the pulse height and the number of pulses occurring at that height contains valuable information, that linearity and repeatability of the system is very important in the accuracy of the resultant measurements. It has been proposed for example in a copending application, Ser. No. 181,910 filed Sept. 20, 1971 which is assigned to the assignee of the present invention, to utilize a gain compensation circuit which adjusts the amount of gain or the amplification which takes place at the surface of these pulses produced by the downhole tool in response to the location of a known energy peak in the gamma ray spectrum in order to preserve the linearity of the system. The known amplitude peak or peaks which may be utilized for this purpose in the above mentioned copending application are usually chosen to be prominent peaks in a gamma ray spectrum which will occur in most instances in a well borehole such as the well known 2.23 MEV hydrogen line photo peak. The relative location of such a peak or peaks which are readily identifiable may then be utilized to adjust the gain of amplifiers in the surface equipment to maintain them at their previously known energy location in a gamma ray energy spectrum comprising a plot of the number of counts vs. the energy (or pulse height) at each measured energy level in the surface equipment.

Gain compensating circuitry such as that disclosed in the above mentioned copending application has proven to be very useful. The borehole temperature varies non-linearly as a function of depth. Hence, any temperature compensation techniques utilized in the downhole circuitry or the surface circuitry taken by themselves could be ineffective in view of the fact that the temperature distribution on the well logging cable is unpredictable. The attenuation caused by the unpredictable effect of the temperature distribution on the cable impedance can cause an apparent gain drift in the system. Thus, systems reliant on the concept of open loop gain compensation in the sense of using predetermined or predicted temperature compensating components in the downhole tool and in the surface circuitry independently can fail to compensate for errors introduced by the cable. Moreover, if a prominent peak in a gamma ray spectrum is unavailable, the operation of systems such as the one described in the previously mentioned copending application is placed in jeopardy.

Other non-linearities which may be introduced into the measurement are those introduced by temperature effects on the detector crystal itself or non-linearities introduced into the measurements by the changing characteristics of the photomultiplier tube used in the scintillation detector to observe the light scintillating crystal. These effects may also be unpredictable in nature and hence uncorrectable by means utilizing open loop or predetermined correction characteristics to be applied to the signal.

Accordingly, it is an object of the invention to provide new and improved methods and apparatus for controlling the gain of gamma ray energy measurement well logging systems.

Another object of the invention is to provide new and improved gain control or linearity apparatus which corrects for non-linearities introduced by the well logging cable, the downhole detector apparatus and the surface electronics used in a well logging system to obtain gamma ray energy measurements.

A still further object of the present invention is to provide improved well logging systems for obtaining the energy distribution of gamma radiation emitted by subsurface earth formations and which utilizes at least two energy windows for observing a reference portion of the gamma ray energy spectrum for controlling the gain of the system in a closed loop manner.

A yet further object of the present invention is to provide improved well logging systems for obtaining the gamma ray energy distribution of subsurface earth formations in a manner more reliable and accurate than heretofore possible.

The above and other objects, features and advantages are provided by the present invention which includes methods and apparatus for generating a gain control signal voltage for controlling the downhole detector power supply voltage and/or the surface amplification circuitry based on the ratio of the number of counts occurring in at least two predetermined energy portions of the gamma ray energy spectra of the subsurface earth formations.

In the invention downhole neutron generator means are provided together with gamma ray detection means and amplification means for sending resulting electrical pulses to the surface over a well logging cable. At the surface the gamma ray pulses are introduced into a pulse rate analyzing apparatus and additionally routed to novel gain control circuitry which monitors a ratio of counts occurring in at least two predetermined energy portions of the gamma ray energy spectrum of the subsurface formations. In a particular embodiment described in more detail herein a portion of the gamma ray energy spectrum containing predominately iron (Fe) gamma ray energy peaks are used for this purpose. After an initial calibration or setup, the two energy regions being monitored are utilized by the gain control circuitry to develop an error signal proportional to the difference from a predetermined constant ratio of the counts occurring in these two energy regions. This signal is proportional to any gain drift which might occur in the system due to either cable effects or circuit effects caused by temperature or other variations in either the downhole or surface circuitry. The signal is applied in an inverse feedback manner to compensate either the detector power supply voltage or to control the surface amplification of the signals, or both, in order to maintain the constant ratio of counts in the preselected portions of the gamma ray energy spectrum.

The foregoing and other objects, features and advantages of the invention will be described in more detail hereinafter. The detailed description which follows, together with the accompanying drawings, illustrate an embodiment of the present invention. It is to be understood however, that the drawings and descriptions herein are for illustrative purposes only and are not to be construed as defining the limits of the invention.

BRIEF DESCRIPTION OF THE DRAWINGS

FIG. 1 is a simplified overall block diagram illustrating the present invention in use in a well logging system.

FIG. 2 is a schematic energy diagram illustrating the relative position of the gamma ray energy spectrum energy windows used for gain control purposes in the present invention.

DESCRIPTION OF THE PREFERRED EMBODIMENTS

Referring initially to FIG. 1 there may be seen a simplified functional and partly pictorial representation of the basic features of a well logging system illustrative of the present invention. More particularly, the system may be seen to be composed of a subsurface probe or sonde 2 which is suspended at one end of a well logging cable 18 and which provides data in the form of electrical signals or pulses to surface instrumentation which is connected to the other or upper end of the cable 18.

Referring to the system in greater detail, the sonde 2 is illustrated as being composed of a fluid tight, elongated, steel housing which is adapted to be passed longitudinally through a borehole 4 in the earth formations 3 and which contains a neutron source 6 and a radiation detector 10, which for present purposes, is preferably a scintillation counter comprised of a photomultiplier 11 and a scintillating crystal 12. As previously discussed, the neutron source 6 bombards adjacent sections of the earth formations 3 with high energy neutrons such as that produced by the well known deuterium-tritium reaction (14 MEV neutrons) as the sonde 2 is moved vertically upward in the borehole 4 by the cable 18. The scintillation counter 10 functions to detect a representative number of gamma rays emanating from the earth formations 3 as a result of such neutron bombardment. A radiation shield 9 of suitable composition is preferably interposed between the scintillation counter 10 and the neutron source 6 to prevent direct irradiation of the counter 10 by the source 6.

High energy neutrons such as those produced by generator 6 easily penetrate the steel casing 19 and its surrounding cement layer 7 to enter the surrounding earth formations 3. Either prompt gamma rays resulting from inelastic scattering of the neutrons or the later arriving capture gamma rays generated by the elements comprising the earth formations surrounding the borehole may be detected by the passage of the resulting gamma radiation through the detector crystal 12 which may be thallium doped, sodium or cesium iodide or the like. The light flashes resulting from these gamma radiations are converted to electrical pulses whose height or voltage level is proportional to the intensity of the light flashes by the photomultiplier tube 11. If desired, an energy discriminator 13 may be used to permit only pulses having a pulse height corresponding to gamma ray energies above a certain predetermined energy level to be passed to the amplifier 14 and the cable driving circuit 15 for transmission to the earth's surface over the cable 18. DC voltage for operating the subsurface equipment is provided on cable 18 by a power supply voltage source 35 and is isolated from the remaining signal processing circuitry at the surface by a pick-off circuit 21. The output voltage of the power supply 35 may be controlled in the manner to be described. Pulses or signals generated by the downhole equipment are supplied to the surface signal processing circuits from the pick-off circuit 21 through amplification means 22 which may be gain controlled in the manner to be subsequently described.

From the amplification means 22 the signals are usually supplied to a multichannel pulse height analyzing apparatus 40 and broken down into the number of counts occurring in each of a plurality of energy ranges by this apparatus. The number of counts occurring at each energy range in the gamma ray energy spectrum may then be processed by data processing circuits 41 if desired and supplied to a recorder 42. The recorder 42 may, as illustrated by the dotted line 16, have a record medium moved as a function of borehole depth by being mechanically or electrically driven by the sheave wheel 17 over which the well logging cable 18 passes in moving the sonde 2 through the borehole 4.

It will of course be understood by those skilled in the art that a continuous neutron source such as an encapsulated mixture of plutonium and beryllium may be used rather than an accelerator source if desired. Similarly a detector other than a scintillation type proportional detector may be used if desired. The bias level or energy discrimination level of the discriminator 13 may be used to appropriately block out gamma ray pulses corresponding to background gamma rays of energy lower than a predetermined level or this may be deleted, if desired. Such an undesirable background could be caused by neutron activation of the iodine comprising the detector crystal itself. If the discriminator is used it reduces the number of count pulses appearing on the cable and, hence, reduces the bandwidth requirements with the cable 18.

In the previously mentioned copending application a gain control system was described which operated to control a surface amplifier analogous to amplifier 22 of FIG. 1 in the present application. The gain of this amplifier was controlled by observing displacements in the apparent location of a known peak or peaks in the gamma ray energy spectrum of the subsurface formations. Of course a known energy peak used for such purpose should be easily observable. Such a gain control system has the virtue of compensating for unpredictable temperature variation effect on the cable and downhole electronics of the well logging system. However, in a case where the expected clearly defined peak is either ambiguous or indistinct because of interferring peaks from other elements comprising the subsurface earth formations, or from excessive background radiation, such a system could encounter difficulty in its operation. In the present invention a ratio of counting rates from two or more energy regions in the gamma ray spectrum are chosen which remain relatively constant under conditions encountered in the borehole environment.

Referring now to FIG. 2, for example, a portion of the gamma ray spectrum encompassing the energy range from 5.7 MEV to approximately 8 MEV is illustrated as the region in which two energy windows utilized for gain control purposes are positioned. This energy range includes several peaks characteristic of iron (Fe) gamma rays including the 5.92 MEV, 6.02 MEV and 7.64 MEV iron gamma ray peaks. One energy window which is about ½ MEV in width is centered near the portion of the spectrum at 7.00 MEV and falls in the region of the gamma ray energy spectrum in which the peak portion of one of these three known iron peaks contributions to the spectrum is maximum. The second energy window, also about ½ MEV in width is positioned with a 7.75 MEV center point and extends over the portion of the gamma ray energy spectrum having the downward sloping or trailing edge of the three expected iron peaks. As the casing 19 and the sonde housing 2 itself contain iron it is generally expected that pulses representative of these iron gamma rays will be present in the gamma ray spectra transmitted from the downhole tool to the surface. However, even if no discernible iron peaks are present in the spectrum in the region of the iron gamma ray peaks described above, the ratio of the counts in these two windows will remain approximately constant. Thus, even if the iron gamma ray peaks are rendered relatively indistinguishable from the background, for example by Compton scattered gamma rays resulting from other elements, the ratio of counts in these two windows will remain relatively constant. This ratio signal then, may be utilized as a reference level for the automatic gain control circuitry shown in more detail in FIG. 1. This provides a means, as will be subsequently described in more detail, to maintain the gain linearity of a system without requiring the presence of discernible known energy peaks in the gamma ray spectrum.

Referring again to FIG. 1, when pulses arrive at the pick-off circuit 21 at the surface, if they have occurred at a proper time as determined by timing pulses generated by the surface clock pulse generator 25, they are passed on to the amplifier 22 and thence to the multichannel pulse height analyzer 40. Pulses from the clock pulse generator 25 are also coupled to the logging cable 18 for control of the downhole neutron source 6 via a pulsing circuit 8 which controls the accelerator portion 16 of the neutron generator. In this manner the neutron generator 6 may be turned on and off on the basis of timing information provided from the surface clock 25 and counter 26 and synchronization may be maintained between the surface signal processing circuitry and the downhole equipment. For example, the surface clock pulse generator 25 and counter 26 may supply a timing pulse indication to the downhole pulser 8 to turn on the accelerator 16 for a predetermined duration of time. Simultaneously the clock pulse generator 25 and counter 26 may generate a conditioning signal to the pick-off circuit 21 to prevent counts occurring during the generation of the neutron pulse by the downhole neutron generator 6 and for a short duration thereafter from passing through the pick-off circuit 21 to the surface data processing circuitry. In this manner later occurring neutron capture events would be the primary data source input to the pulse height analyzer 40.

Input signals provided by the pick-off circuit 21 to the pulse height analyzing circuitry comprise a series of pulses, each of whose amplitude is indicative of the energy which the gamma ray causing it lost in the detector crystal 12. This, in turn, is related to the energy possessed by the gamma ray as it impinged on the crystal 12. These signals are applied to the gain control amplifier 22 and from there to the multi-channel pulse height analyzer 40 and the linearity control circuit shown in the large dotted box of FIG. 1. In the linearity control circuit the input signals are provided to two single channel pulse height analyzers 23 and 24 whose energy ranges are set to pass only those pulses occurring in the two energy ranges previously described as being monitored for linearity control of the system. Thus, for example, only gamma ray pulses having heights corresponding to gamma rays in the first, or lower, energy band pass through single channel pulse height analyzer 23. Those having pulse heights corresponding to the energies of gamma rays in the higher energy band are passed through the single channel pulse analyzer 24. The passed pulses enter counters 27 and 29 respectively. Each pulse falling within the two predetermined energy ranges upon entry into the counters 27 and 29 are summed by these counters into buffer registers 28 and 30 respectively. Thus, at any instant during the operating cycle of the linearity control circuit, the contents of buffer registers 28 and 30 contain the number of counts in the operating cycle, since the last linearity control circuit reset pulse, which have occurred within the respective energy ranges of the single channel pulse analyzers 23 and 24. The digital numbers in buffer registers 28 and 29 are supplied to digital to analog converters 31 and 32 where they are converted into corresponding analog voltage levels. These two voltage levels from D-A converters 31 and 32 are provided as inputs to an analog divider circuit 33. The divider circuit 33 provides an output signal proportional to the ratio of the contents of buffer register 30 to buffer register 28. This ratio voltage is then supplied via low pass filter 34 to control the gain of amplifier 22 and the output voltage level of the downhole circuit power supply 35. The clock or timing source 25 running freely into a counter 26 provides reset and clock pulses for clearing the counters 27 and 29 and buffer registers 28 and 30 at a regular interval. This interval comprises the operating cycle of the system since the same clock or timer 25 is used to control the downhole electronics as previously described.

In operation the system may be described as follows: At the beginning of a new cycle of operation a clock pulse is provided via counter 26 (i.e., upon overflow of the counter as it sums pulses from clock 25) and this pulse used to signal the pulsing circuit 8 in the downhole tool to turn on the neutron generator for a predetermined time duration. The same pulse from the counter 26 is supplied to a second counter 45. When counter 45 reaches a predetermined value a linearity control pulse is supplied on the reset and clock lines to clear buffer registers 28 and 30 and to reset counters 27 and 29 to zero for the new cycle of operation. The pulse from counter 26 is also provided to the pick-off circuit 21 to prevent acceptance of any count pulses from the downhole tool for a predetermined length of time, for example, in the previously described case where it is desired to measure neutron gamma ray capture spectra. Of course, if inelastic gamma ray spectra are to be measured, this time delay would not be used. By use of the two counters 45 and 26, the linearity control system operating cycle may comprise several operating cycles of the neutron pulse source from the downhole tool. Under typical operating conditions the downhole neutron pulse generator 6 may be supplied with control signals from counter 26 up to 20,000 times per second. The linearity control circuit may typically be reset for a new operating cycle once every 2 or 3 seconds or whenever a large enough number of counts occur in the buffer register 28 and 30 to insure good counting statistics.

Immediately after pulsing the downhole neutron source 6, gamma rays entering scintillation detector 10 are detected and electrical pulses representative of the energy thereof generated, amplified by the amplifier 14, and transmitted up the cable 18 by cable driving circuit 15. At the surface the pick-off circuit 21, after the previously mentioned predetermined delay time, allows the gamma ray pulse signals to pass through for input to amplifier 22. Those signals having pulse heights falling within the two previously described energy ranges being used for linearity control are passed by single channel pulse analyzers 23 and 24 to counters 27 and 29 and are summed into buffer registers 28 and 30. The signals in registers 28 and 30 are then converted into analog form by digital to analog converters 31 and 32 and supplied to the analog divider 33 which produces a ratio control voltage as its output. The ratio control voltage is proportional to the ratio of the counts of gamma rays occurring in the two previously described energy windows. This control voltage is then supplied via the low pass filter 34 to control the gain of amplifier 22 and/or the output voltage of the downhole circuitry power supply 35 to maintain approximately a constant counts ratio in the two energy windows.

The data pulse signals from amplifier 22 are also supplied to the multichannel pulse height analyzer 40, which may be of conventional design, and from thence to additional data processing circuits 41 and the recorder 42 which is driven as a function of borehole depth as previously described. Thus, a system is provided which dynamically controls the linearity and gain of the well logging system by maintaining an appropriately constant counts ratio in a predetermined portion of the spectrum in at least two energy windows.

It will be appreciated by those skilled in the art that other circuitry than that shown in the preferred embodiment may be utilized. For example, more than two energy windows could be used if desired and the ratios of counts occurring in more than two portions of the spectrum taken and utilized for this purpose. Also, other energy regions than those illustrated in the preferred embodiment may be used, provided the regions chosen are such that the ratio of counts occurring therein remains approximately constant under usual borehole conditions. It would be undesirable to use energy regions which gave counts ratios which were a function of formation lithology or porosity, for example. Similarly, portions of the circuit shown in the preferred embodiment may be replaced by their equivalents in analog or digital form without departing from the spirit of the invention.

It is therefore apparent that the above description may make such changes and modifications of the disclosed principle apparent to those skilled in the art. Such changes are obvious which come under the broader aspects of the invention. It is therefore the aim in the appended claims to cover all such changes and modifications as fall within the true spirit and scope of the invention.

I claim:

1. A method for linearizing and controlling the gain of a nuclear well logging system comprising the steps of:

measuring the energy spectrum of gamma rays produced by earth formation materials surrounding a well borehole;

measuring, in at least two predetermined energy band portions of said gamma ray energy spectrum, the number of counts of gamma rays having an energy falling within said energy band portions;

generating a signal proportional to the ratio of counts within said at least two predetermined energy band portions and comparing said ratio signal with at least one constant ratio calibration signal;

generating an error signal proportional to the difference of said ratio signal and said constant ratio calibration signal; and using said error signal to control the linearity of said well logging system.

2. The method of claim 1 wherein at least three predetermined energy band portions are used and at least two such ratio signals generated and compared with at least two constant ratio calibration signals.

3. The method of claim 1 wherein two predetermined gamma ray energy band portions each about 0.5 MEV in width and located with centers at about 7.0 and 7.75 MEV are used.

4. The method of claim 1 wherein two gamma ray energy band portions situated so that one energy band portion is located approximately near the peak of a known common well borehole material gamma ray line in the gamma ray energy spectrum and a second energy band portion is located approximately on the sloping edge of said known common material gamma ray line in the gamma ray energy spectrum are used to generate said ratio signal.

5. The method of claim 1 wherein said error signal is used to control the operating voltage supplied to the downhole tool portion of the nuclear well logging system to preserve linearity of the system.

6. Apparatus for linearizing and controlling the gain of a nuclear well logging system comprising:

means for measuring the energy spectrum of gamma rays produced by earth formation materials surrounding a well borehole;

means for measuring in at least two predetermined energy band portions of said gamma ray energy spectrum, the number of counts of gamma rays having an energy falling within said energy band portions;

means for generating a signal proportional to the ratio of counts within said predetermined energy band portions and for comparing said ratio signal with at least one constant ratio calibration signal;

means for generating an error signal proportional to the difference of said ratio signal and said constant ratio calibration signal; and means for using said error signal to control the linearity of said well logging system.

7. The apparatus of claim 6 wherein said means for using said error signal to control the linearity of said well logging system includes means for controlling the gain of amplification of signals representative of gamma rays from the earth formations surrounding the well borehole.

8. The apparatus of claim 6 wherein said means for using said error signal to control the linearity of said well logging system includes means for controlling the operating voltage supplied to the downhole portion of said system.

9. The apparatus of claim 6 wherein said two predetermined gamma ray energy band portions are each about 0.5 MEV in width and are located with centers at about 7.0 and 7.75 MEV.

* * * * *